United States Patent [19]

Suzuki

[11] 3,944,887

[45] Mar. 16, 1976

[54] CROWBAR SWITCH

[75] Inventor: Yasuo Suzuki, Kyoto, Japan

[73] Assignee: Nissin Electric Co., Ltd., Kyoto, Japan

[22] Filed: June 3, 1974

[21] Appl. No.: 475,509

[52] U.S. Cl. .................... 317/16; 313/297; 315/244

[51] Int. Cl.[2] ............................................ H02H 9/06

[58] Field of Search .......... 317/16, 61.5, 62, 74, 71, 317/72, 61, 151; 337/18, 20, 25, 28, 29, 34; 313/155, 156, 157, 296, 297, 306; 315/36, 241 R, 242, 244, 58, 60, 62

[56] References Cited

UNITED STATES PATENTS

| | | | |
|---|---|---|---|
| 2,508,954 | 5/1950 | Latour et al. | 313/155 |
| 2,631,261 | 3/1953 | Hough et al. | 313/198 |
| 3,413,518 | 11/1968 | Chafer et al. | 313/306 |
| 3,614,536 | 10/1971 | Johansson | 317/74 |
| 3,742,246 | 6/1973 | Nitta et al. | 317/151 X |
| 3,826,948 | 7/1974 | Polese et al. | 313/306 |

*Primary Examiner*—J. D. Miller
*Assistant Examiner*—Patrick R. Salce
*Attorney, Agent, or Firm*—Christensen, O'Connor, Garrison & Havelka

[57] ABSTRACT

A crowbar switch having a start and a crowbar gap each having a trigger electrode therein. The two gaps are disposed close to each other so that the photons and thermoelectrons emitted from the arc produced by a discharge in the start gap ionize the ambient gas about the crowbar gap for easier occurrence of a discharge in the crowbar gap.

10 Claims, 7 Drawing Figures

CROWBAR SWITCH

This invention relates to a crowbar switch having a function of electric discharge.

Crowbar switches are widely used to short-circuit the opposite ends of a coil in which energy is stored, in particular, a coil which is used in equipment used in plasma physics research for enclosing plasma for an extended period of time.

There are many known types of crowbar switches, such as a mechanically operating switch, a dielectric switch, an ignitron and a fast air gap crowbar switch using a low pressure gap as a decoupling element. However, the mechanical switch and the ignitron are slow in the speed of operation. Although the dielectric switch is fast in the speed of operation, it must be replaced by a new switch after every discharge. The fast air gap crowbar switch requires a high and a low pressure atmosphere, so that the manufacturing cost is high and maintenance is troublesome.

Accordingly, the primary object of the invention is to provide an improved crowbar switch having a function of electric discharge.

Another object of the invention is to provide such a crowbar switch as aforesaid in which the delay time in operation is greatly reduced.

Another object of the invention is to provide such a crowbar switch as aforesaid which has little time jitter in operation.

Another object of the invention is to provide such a crowbar switch as aforesaid which includes a start switch which transfers energy stored in a condenser to a coil.

Another object of the invention is to provide such a crowbar switch as aforesaid which includes a crowbar gap and a start gap so that the photons and thermoelectrons produced by the arc in the start gap ionize the ambient atmosphere of the crowbar gap so that the crowbar gap is rendered conductive by a lower trigger voltage applied thereto than otherwise.

The invention will be better understood from the following detailed description of a preferred embodiment thereof with reference to the accompanying drawings, wherein.

Figure 1:
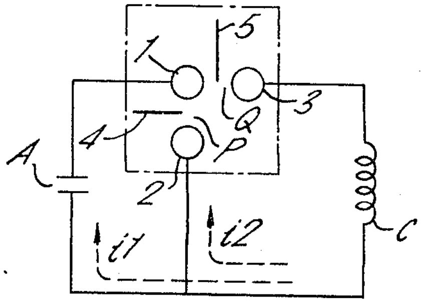
FIG. 1 is a circuit diagram for explanation of the principle of operation of the crowbar switch of the invention.

Referring in detail to FIG. 1, there are shown three electrodes 1, 2 and 3, with a first gap P formed between the electrodes 1 and 2 and a second gap Q formed between the electrodes 1 and 3. The gaps P and Q are used as the crowbar gap and the start gap, respectively. Trigger electrodes 4 and 5 are provided for triggering discharge in the gaps P and Q, respectively.

The start gap is connected between a coil C and a capacitor A which supplies energy to the coil C. When the trigger electrode 5 is operated to cause a discharge to take place in the start gap Q, the capacitor A which has until then been sufficiently charged is connected to the coil so that the charge in the capacitor A is discharged through the coil C.

Figure 2:
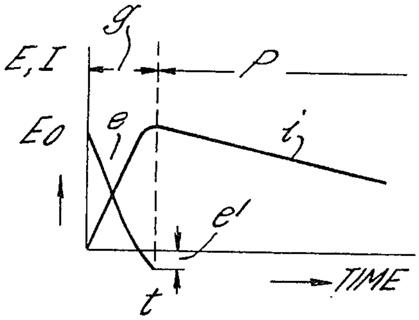
FIG. 2 is a waveform diagram of the voltage and current in the circuit of FIG. 1.

After the start of the discharge in the gap Q, the charge voltage Eo of the capacitor decreases while the current *i* flowing from the capacitor to the coil C increases as time passes as shown in FIG. 2, until the voltage Eo drops to zero, whereafter the polarity of the voltage is reversed. When the voltage of this opposite polarity has become *e'* (usually several hundred to several thousand volts) at time *t*, the electrode 4 is operated to cause a discharge to take place in the crowbar gap P, whereupon the coil C to which energy has been supplied from the capacitor A and stored therein is short-circuited through the gap P so as to discharge the energy through the gap P.

The current *i*2 resulting from the discharge bypasses the capacitor A, so that current does not fluctuate but gradually decreases as time passes.

In FIG. 2, *i* shows the characteristic curve of the current flowing through the coil; *q* is the time capacitor A discharges through the start gap Q; and *p* is the time the coil C is short-circuited due to the discharge through the crowbar gap P.

The object of the invention is to improve the discharge characteristic of the crowbar gap and particularly to start the discharge in accordance with a desired characteristic. To this end it is required that discharge should be started rapidly and without fail, with as little time lag or fluctuation as possible. In accordance with the invention, the arc produced when a discharge takes place in the start gap is utilized to ionize the ambient air about the crowbar gap by the effect of photoirradiation so as to provide an atmosphere for easier occurrence of discharge in the gap. To this end the start gap and the crowbar gap are positioned close to each other, so that the arc produced by the discharge in the start gap is adjacent to the crowbar gap. Alternatively, the arrangement may be such that the arc produced in the start gap is moved toward the crowbar gap by the electromagnetic force produced by the arc and the magnetic field produced by the arc. With these arrangements it is easily possible to ionize the ambient atmosphere or gas in and about the crowbar gap.

Figure 3:
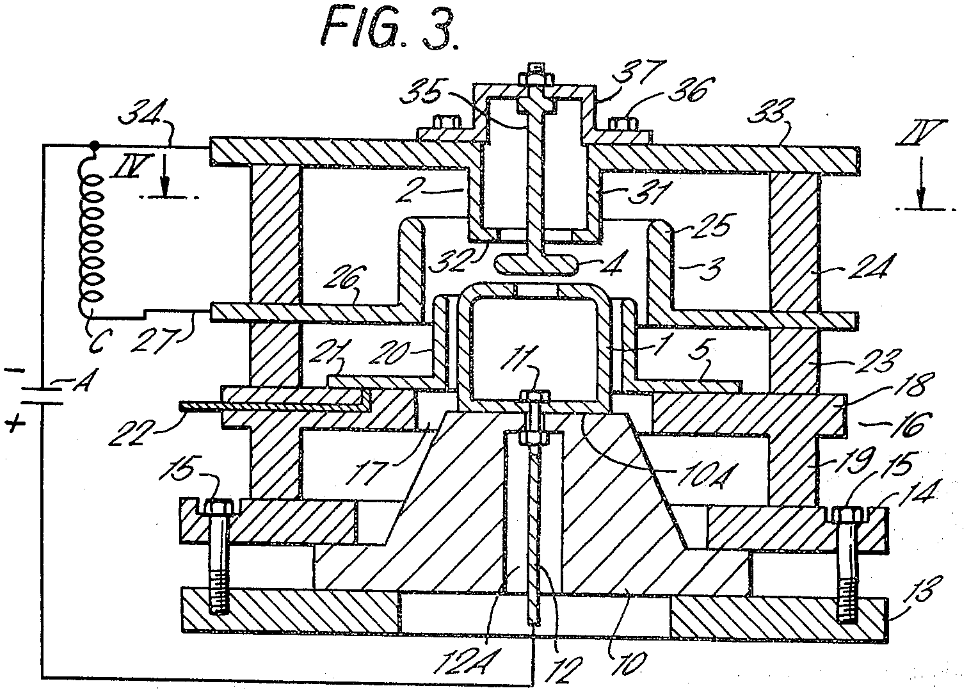
FIG. 3 is a side view of a switch constructed in accordance with the invention.
Figure 4:
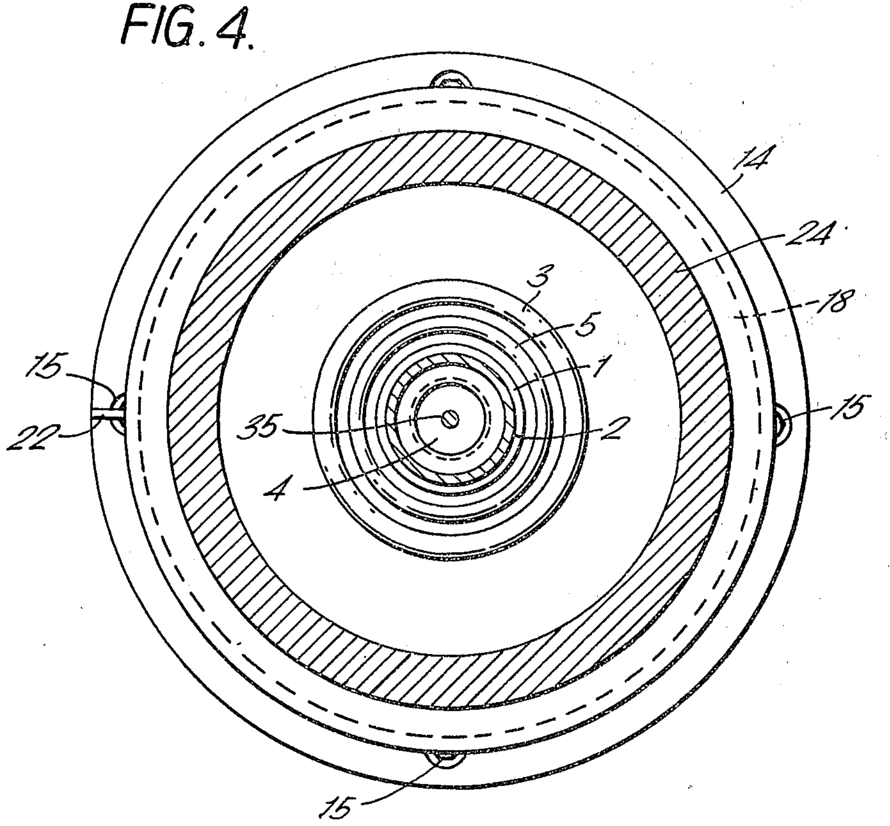
FIG. 4 is a transverse section taken along line IV — IV in FIG. 3.

FIGS. 3 and 4 show the detailed construction of a switch constructed in accordance with the invention. The electrode 1 schematically shown in FIG. 1 is supported by a base 10 of an electrically insulating material. The electrode 1 is of a cylindrical shape with its bottom 10A secured to the top of the base 10 by means of a bolt 11. A lead 12 connected to the bottom 10A passes through a hole 12A formed in the base 10 so as to be connected to the positive terminal of the capacitor A.

The base 10 has a bottom flange sandwiched between an upper and a lower disk 13 and 14 both of an electrically insulating material, which are clamped by bolts 15.

On the disk 14 there is secured a support member 16 made of an insulating material and comprising a disk-like body 18 having a central hole 17 therein and a circular leg 19 depending from the bottom of the body 18. The hole 17 encircles the bottom of the electrode 1.

A trigger electrode 5 is provided on the upper surface of the support member 16. The electrode 5 comprises a hollow cylindrical body 20 encircling the electrode 1 and at the bottom end of the body an out-turned flange or radial skirt 21 secured to the disk-like body 18 of the support member 16. A lead 22 has one end connected to the flange 21 and extends for exterior connection. Discharge in the start gap Q is initiated through utilization of the lead 22.

A support ring 23 of an insulating material is provided on and secured to the support member 16, and another support ring 24 is provided above the ring 23. The electrode 3 comprises a hollow cylindrical portion 25 and a flange 26 radially outwardly extendly from the bottom end thereof. The flange 26 is sandwiched between the two rings 23 and 24. A lead 27 has its one end connected to the flange 26 of the electrode 3 and its other end connected to one end of the coil C.

Figure 5:
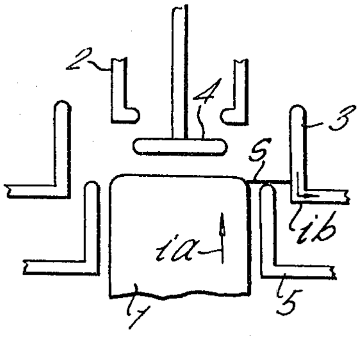
FIGS. 5 – 7 are somewhat schematic side view of the switch sequentially showing the state of discharge in the discharge gap of the device of FIG. 3.

The hollow cylindrical portion 25 of the electrode 3 encircles the hollow cylindrical body 20 of the trigger electrode 5, with the bottom end of the cylindrical portion 25 being positioned below the level of the top end of the electrode 1 and that of the cylindrical body 20 of the trigger electrode 5. With this arrangement, when a discharge has taken place between the electrodes 1 and 3 to produce an arc S therebetween, the resulting current flows through the electrode 1 upwardly as indicated at *ia* (FIG. 5) and from the top end of the electrodes the current flows as the arc S to the cylindrical body 25 of the electrode 3, where the current flows through the flange 26 as indicated at *ib*.

Figure 6:
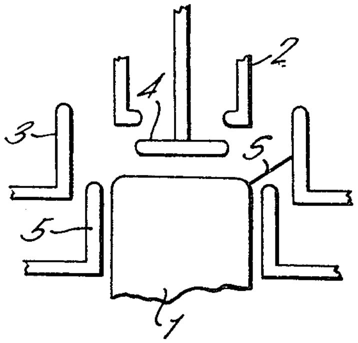
Figure 7:
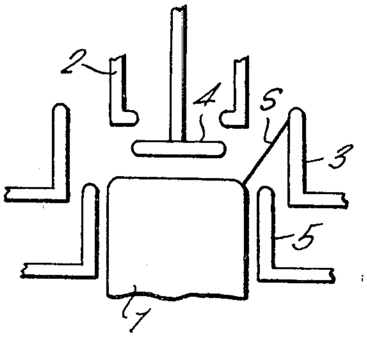

Thus the current flows between the electrodes 1 and 3 along a generally U-shaped path, within which the arc current then produces a magnetic field. The interaction between the field and the arc current produces an electromagnetic force to move the arc upwardly so that the one end or leg of the arc at the side of electrode 3 is displaced upward as shown in FIGS. 6 and 7. The arc produces thermoelectrons and photons which ionize the ambient air or gas within the cylindrical body 25 of the electrode 3 which includes the upper portion of the electrode 1.

The electrode 2 comprises a hollow cylindrical body 31 which has a bottom 32 positioned within the cylindrical body 25 of the electrode 3. The bottom surface 32 faces the top surface of the electrode 1 with a gap therebetween, within which a disk-like trigger electrode 4 is disposed.

The electrode 2 is provided with a radial flange 33 extending from the upper end of the cylindrical body 31 and the flange 33 is supported by and secured to the support ring 24.

A lead 34 has its one end connected to the flange 33 and its opposite end connected to the coil C and the capacitor A, so that when a discharge occurs between the electrodes 1 and 2, the coil C is short-circuited through the electrodes.

The trigger electrode 4 is formed at the bottom end of a rod 35 depending from a frame 37 made of an insulating material and secured to the flange 33 of the electrode 2 by means of bolts 36. The electrode 4 is positioned intermediate the two electrodes 1 and 2.

The trigger electrode 4 is triggered only after the trigger electrode 5 was triggered to start the discharge between the electrodes 1 and 3, so that at the time the electrode 4 is triggered, the gas within the cylindrical body of the electrode 3 is sufficiently ionized. As a result, when the electrode 4 is triggered, a discharge takes place between the electrodes 1 and 4 without delay.

The electrodes 1, 2, 3, 4 and 5 may be of any desired shape. The illustrated hollow cylindrical or plane shape, however, is preferred since it helps lengthen the life of the electrodes.

In the illustrated embodiment, the trigger electrode 4 is held at a fixed position by fixing the rod 35 to the frame 37. It is possible to change the position of the electrode 4 by axially moving the support rod 35.

In the illustrated embodiment, the electrode 1 is commonly used for both the start gap and the crowbar gap. This arrangement makes the device compact and advantageously decreases the inductance.

The concentric arrangement of the electrodes is preferred since it makes easier than otherwise adjustment of the relative positions of the electrodes and replacement of the component parts. However, any other suitable arrangements can also be employed.

Since both the start gap and the crowbar gap are provided within the space defined by the members 16, 23, 24, etc., it is easier to enclose and retain an insulation gas within the space than if the two gaps were provided in separated spaces.

What I claim is:

1. A crowbar switch comprising: a first central electrode; a second hollow cylindrical electrode encircling said central electrode so that a start gap is formed between said electrodes; a first trigger electrode for said start gap encircling said central electrode and disposed between said central electrode and said hollow cylindrical electrode; a third electrode disposed inside said second electrode and facing said first electrode so that a crowbar gap is formed between said first and third electrodes; a second trigger electrode for said crowbar gap disposed in said crowbar gap, whereby the gas in said crowbar gap is ionized by the photons and thermoelectrons induced by the arc produced by discharge in said start gap.

2. The device of claim 1, wherein when an arc is produced in said start gap by a discharge between said first and second electrodes, an electromganetic force is produced by the current of said arc and the magnetic field produced by said arc current to cause said arc to move toward said crowbar gap between said first and third electrodes.

3. The device of claim 1, wherein said electrodes forming each said gap are disposed in a single chamber.

4. The device of claim 1 wherein, said first electrode in connected to one end of a capacitor for storing energy; said second electrode is connected to one end of a coil; and said third electrode is connected to the other end of said capacitor and coil.

5. A crowbar switch circuit, comprising:

electrical energy storage means;

electrical load means;

a start switch gap connected between energy storage means and said electrical load means for conducting energy stored in said storage means to said electrical load means when said start switch gap is fired and assumes a condition of discharge therein;

a crowbar switch gap, said crowbar switch gap being connected across said electrical load means for short circuiting said load means when said crowbar switch gap is fired, said start switch gap and said crowbar switch gap being positioned close to one another such that said condition of discharge in said start switch gap ionizes ambient gas about said crowbar switch gap thereby reducing the time and energy necessary to fire said crowbar switch gap; and means for firing said start switch gap and said crowbar switch gap.

6. The apparatus of claim 5, including means defining an enclosure, and means positioning said start switch gap and said crowbar switch gap within said enclosure.

7. The apparatus of claim 5 wherein said energy storage means is a capacitor, and said load means is a coil.

8. The apparatus of claim 5, wherein said firing means includes trigger electrodes positioned in said start switch gap and said crowbar switch gap, and means for selectively energizing said trigger electrodes.

9. The apparatus of claim 5, wherein said start switch gap and said crowbar switch gap are defined by two spaced electrodes and a common electrode spaced therefrom.

10. The apparatus of claim 5, wherein said gaps are disposed such that the discharge in said start switch gap is moved toward said crowbar switch gap by electromagnetic force.

* * * * *